United States Patent
Saurabh et al.

(10) Patent No.: US 10,296,936 B1
(45) Date of Patent: May 21, 2019

(54) METHOD AND SYSTEM FOR MEASURING EFFECTIVENESS OF A MARKETING CAMPAIGN ON DIGITAL SIGNAGE

(75) Inventors: Varij Saurabh, State College, PA (US); Rajeev Sharma, State College, PA (US); Namsoon Jung, State College, PA (US)

(73) Assignee: VideoMining Corporation, State College, PA (US)

( * ) Notice: Subject to any disclaimer, the term of this patent is extended or adjusted under 35 U.S.C. 154(b) by 1493 days.

(21) Appl. No.: 12/283,606

(22) Filed: Sep. 12, 2008

Related U.S. Application Data

(60) Provisional application No. 60/995,637, filed on Sep. 26, 2007.

(51) Int. Cl.
  *G06Q 10/00* (2012.01)
  *G06Q 30/02* (2012.01)

(52) U.S. Cl.
  CPC ..... *G06Q 30/0242* (2013.01); *G06Q 30/0246* (2013.01); *G06Q 30/02* (2013.01); *G06Q 30/0201* (2013.01)

(58) Field of Classification Search
  CPC ............... G06Q 30/02; G06Q 30/0273; G06Q 30/0277; G06Q 30/0202; G06Q 30/0251; G06Q 30/0201; G06Q 30/0242; G06Q 30/0246
  USPC .................................................. 705/10, 7.29
  See application file for complete search history.

(56) References Cited

U.S. PATENT DOCUMENTS

| | | |
|---|---|---|
| 5,227,874 A | 7/1993 | Von Kohorn |
| 5,873,068 A | 2/1999 | Beaumont et al. |
| 5,966,696 A * | 10/1999 | Giraud ................. 705/14.41 |
| 6,029,176 A | 2/2000 | Cannon |
| 6,045,226 A | 4/2000 | Claessens |
| 6,286,005 B1 | 9/2001 | Cannon |
| 6,353,929 B1 | 3/2002 | Houston |
| 6,443,840 B2 | 9/2002 | Von Kohorn |
| 6,516,464 B1 | 2/2003 | Claessens |
| 6,529,940 B1 | 3/2003 | Humble |
| 6,763,334 B1 | 7/2004 | Matsumoto et al. |
| 6,772,129 B2 | 8/2004 | Alvarez et al. |
| 6,922,691 B2 | 7/2005 | Flank |

(Continued)

OTHER PUBLICATIONS

The Impact of Digital Signage as a Retail Atmospheric Tool—By Dennis et al. 2007.*
Behavioral Effects of Digital Signage—By Raymond R. Burke Journal of Advertising Research—Jun. 2009.*
U.S. Appl. No. 11/805,321, Sharma, et al.

(Continued)

*Primary Examiner* — William S Brockington, III

(57) ABSTRACT

The present invention is a system and method for measuring effectiveness of a marketing campaign on digital signage on many different signage networks, by measuring the efficiency of the campaign at reaching targeted audience and the effectiveness of conveying the message. This invention provides a solution to the challenges created by wide variety of measurements and lack of accuracy. By using automated audience measurement, the current invention is able to collect, large, statistically significant data for analysis. Non-intrusive, computer based measurement also ensure that the data is free from any biases. The media content rating system will provide a quantitative measure of how many people did the campaign reach and what effect did it have. The data will be available at the aggregate level, at network level and down to the screen level.

18 Claims, 12 Drawing Sheets

(56) References Cited

U.S. PATENT DOCUMENTS

| | | | |
|---|---|---|---|
| 7,080,027 B2 | 7/2006 | Luby et al. | |
| 7,151,540 B2 | 12/2006 | Young | |
| 7,194,425 B2 | 3/2007 | Nyhan et al. | |
| 2002/0111146 A1* | 8/2002 | Fridman et al. | 455/99 |
| 2002/0184098 A1* | 12/2002 | Giraud et al. | 705/14 |
| 2003/0220830 A1* | 11/2003 | Myr | 705/10 |
| 2004/0111454 A1* | 6/2004 | Sorensen | 708/200 |
| 2005/0039206 A1* | 2/2005 | Opdycke | 725/35 |
| 2007/0027754 A1* | 2/2007 | Collins | G06Q 10/0631 705/14.48 |
| 2007/0136133 A1* | 6/2007 | Li | 705/14 |
| 2007/0182818 A1* | 8/2007 | Buehler | G08B 13/19602 348/143 |
| 2007/0271518 A1* | 11/2007 | Tischer | H04H 60/31 715/744 |
| 2008/0172261 A1* | 7/2008 | Albertson et al. | 705/7 |

OTHER PUBLICATIONS

U.S. Appl. No. 11/818,485, Saurabh, et al.
U.S. Appl. No. 11/818,554, Sharma, et al.
U.S. Appl. No. 11/880,421, Sharma, et al.
Cohn, J.F., et al., "Automated face analysis by feature point tracking has high concurrent validity with manual FACS coding," Psychophysiology, pp. 35-43, 1999.
Essa, I.A., et al., "Facial expression recognition using a dynamic model and motion energy," presented at International Conference on Computer Vision, Jun. 1995.
Yacoob, Y., et al., "Recognizing human facial expression," University of Maryland, Technical Report CS-TR-3265, May 1994.

\* cited by examiner

METHOD AND SYSTEM FOR MEASURING EFFECTIVENESS OF A MARKETING CAMPAIGN ON DIGITAL SIGNAGE

CROSS-REFERENCE TO RELATED APPLICATIONS

This application claims the benefit of U.S. Provisional Patent Application No. 60/995,637, filed Sep. 26, 2007.

FEDERALLY SPONSORED RESEARCH

Not Applicable

SEQUENCE LISTING OR PROGRAM

Not Applicable

BACKGROUND OF THE INVENTION

Field of the Invention

The present invention is system and method for measuring effectiveness of a marketing campaign on digital signage on many different signage networks, by measuring the efficiency of the campaign at reaching targeted audience and the effectiveness of conveying the message, wherein the media content rating system will provide a quantitative measure of how many people did the campaign reach and what effect did it have.

Background of the Invention

There have been prior attempts for measuring marketing campaigns.

U.S. Pat. Nos. 6,286,005 and 6,029,176 of Cannon (hereinafter Cannon) disclosed computer based systems for analyzing audience data. Cannon discloses a method and apparatus for quickly and easily retrieving, manipulating, and analyzing large quantities of computer-based data relevant to television-viewing consumers. The key differences between the systems disclosed by Cannon and the one in the current invention are that 1) Cannon primarily focused on television audience, 2) the process used to data collection is different, 3) measurement provided by two systems are different.

First, the definition of audience is very different from television and digital signage. For television measurement, audience is defined as a household which had the television turned on when content was played. Whereas, for digital signage, audience is defined as the group of persons present in the vicinity of the signage when the content was played. The definition of audience creates unique challenges in data collection and analysis; it also changes the types of analysis advertisers need. Cannon does not cover the challenges offered by digital signage.

Secondly, the system described by Cannon processes data primarily collected through exit interviews, telephone interviews, online surveys etc. which require active participation from the audience members. Whereas, the current invention uses automated video based data collection to acquire the data. The types of data collected are very different. For example, Cannon discusses that the demographic information can include information such as a viewer's age, geographical location, income, and level of education, which cannot be calculated using computer vision algorithms. Therefore, the definition of the demographic information in Cannon is different from that of the current invention. Applicant's demographic information is primarily concerned with the customer in the vicinity of a digital signage, whereas the demographic information in Cannon is primarily concerned with the television-viewing consumers, so the approaches as to how the demographic information is gathered and applied in the embodiments are significantly different between Cannon and the current invention.

Thirdly, the current invention provides unique measurements not offered by Cannon. The current invention includes analyses of the actual time audience members spend watching the screen, the emotional impact of the content on the audience, and demographic segmentation based on automated estimation of age, gender, ethnicity, and shopping behavior. None of these parameters are measured or analyzed by the system proposed by Cannon.

U.S. Pat. No. 7,194,425 of Nyhan et al. (hereinafter Nyhan) disclosed a system for evaluating and/or monitoring effectiveness of on-line advertising. The system proposed by Nyhan only measures the stimulus and not the reaction audience has to it. The data collected by Nyhan is about the number of times advertisement was displayed on the computer screen of an audience member. The key differences between the systems proposed by Nyhan and the one in current invention are that 1) Nyhan measures the effectiveness of internet campaign, the current invention measures the effectiveness of digital signage, 2) Nyhan collects data about the number of times an ad was displayed, the current invention combines this data with actual audience response to the ad.

U.S. Pat. No. 6,763,334 of Matsumoto (hereinafter Matsumoto) disclosed a system for arranging delivery of advertisements over a network such as the internet. The primary goal of the system described by Matsumoto is to deliver the content, and it also provides feedback to the advertiser when the content is aired. This feedback can be used to analyze the marketing campaign, but as in previous patent it does not measure the response of the audience it only measures the stimulus. The type of media measured is also different, Matsumoto focuses primarily on internet, whereas the current invention focuses on digital signage.

U.S. Pat. No. 5,873,068 of Beaumont et al. (hereinafter Beaumont) disclosed a system for display based marketing message control system and method for public switched telephone systems. The primary goal of the system described by Beaumont is to deliver the content, and it also provides feedback to the advertiser. This feedback can be used to analyze the marketing campaign, but as in previous patent it does not measure the response of the audience it only measures the stimulus. The type of media measured is also different, Beaumont focuses primarily on analog telephones, whereas the current invention focuses on digital signage.

U.S. Pat. No. 7,151,540 of Young (hereinafter Young) disclosed a system for audience attention and response evaluation. The patent describes a process of showing a given video content to a panel of people and then asking them to identify particular images from the content. The higher the number of people who identify a given image the higher rating that image gets. The system disclosed will automatically tabulate and analyze the data collected. The key different between this system and the current invention is that the current invention uses non-obtrusive, automated software and process to collect the audience data. Also, the disclosed system first ranks the images in the content and then tries to estimate the point in time at which most viewers stopped engaging the content. The current invention actually measures the point in time when the viewers start and stop looking at the content. The current system is superior because it directly measures the viewer behavior, is more accurate, and does not require active participation from viewers.

U.S. Pat. No. 6,529,940 of Humble (hereinafter Humble) disclosed a system for in-store marketing and data collection. Humble has disclosed a system that automatically distributes content to interactive digital signage place inside a store. The audience who engage with the signage can provide feedback about the content by using the response mechanism with the screen. The feedback data collected by the system can be used by the advertisers to measure the effectiveness of in-store marketing campaigns. The key differences between their system and the current invention are their system requires active participation from the audience and can work only for interactive signage. The current invention is superior because it directly measures the viewer behavior, is more accurate, and does not require active participation from viewers.

U.S. Pat. No. 6,516,464 of Claessens (hereinafter Claessens) disclosed a system for detecting audience response audio visual stimuli. The system disclosed in the patent requires a panel of viewers to watch the content and use a computer based system to respond to it in real time. The viewer can register his or her likes or dislikes and qualitatively explain the response. The data is then used to evaluate the content. The key differences between this system and the current invention are this system requires active participation from the audience and can measure the effectiveness of a piece of content but not of a whole content. The current invention is superior because it directly measures the viewer behavior, is more accurate, and does not require active participation from viewers.

U.S. Pat. No. 6,353,929 of Houston (hereinafter Houston) disclosed a cooperative system for measuring electronic media. The system disclosed in the patent provides media measurement and analysis based on the response received from a panel of viewers. The key differences between this system and the current invention are this system requires participation from the audience and from a research data collection agent, whereas the current invention directly measures the viewer behavior, is more accurate, and does not require active participation from viewers.

U.S. Pat. No. 6,772,129 of Alvarez et al. (hereinafter Alvarez) disclosed a system for determining the effectiveness and efficiency of advertising media. The system disclosed in the patent focuses on different parameters for measurement of marketing campaign than the current invention. Alvarez uses sales uplift and profit increase as the measures of effectiveness, whereas the current invention uses measures such as total exposure, engagement, emotional response, etc. in addition to sales uplift as a measure of effectiveness.

U.S. Pat. No. 7,080,027 of Luby et al. (hereinafter Luby) disclosed a system for analyzing the effectiveness of marketing strategies. The disclosed system evaluates the effectiveness of a strategy at creating demand for a given product based on survey responses. It specifically focuses on measuring the effectiveness of sales presentation in a business-to-business (B2B) environment. The key differences between this system and the current invention are this system requires participation from the audience and focuses on B2B sales and marketing rather than business-to-customer (B2C) marketing campaigns.

U.S. Pat. Nos. 5,227,874 and 6,443,840 of Von Kohorn (hereinafter Von Kohorn) disclosed a system for measuring the effectiveness of stimuli on decisions of shoppers, and a system for evaluation of responses of participatory broadcast audience with prediction of winning contestants; monitoring, checking and controlling of wagering, and automatic crediting and couponing. The disclosed system focuses on measurement of television audience and uses a variety of monetary incentives to the respondents. The responses are collected electronically and then analyzed. The system disclosed in the patent focuses on marketing strategies employed by the advertisers in broadcast and other out-of-store media, whereas the current invention focuses on strategies employed in-store. The system disclosed by Von Kohorn depends on response from a panel of participants for the data that forms the basis for analysis. The current invention is foreign to Von Kohorn because it directly measures the viewer behavior, is more accurate, and does not require active participation from viewers.

U.S. Pat. No. 6,045,226 of Claessens (hereinafter Claessens) disclosed a system for measuring the visual attention of subjects for a visible object. The disclosed system emits an invisible beam of light to scan the area of interest. The beam of light is reflected from the retina and/or cornea of said persons or animals. This reflected beam is used to estimate the direction in with the subject is looking and the duration of view. The system can be used to measure the duration for which a person looks directly at a signage. The key differences between this system and the current invention are this system uses a specified source of radiation to measure the duration of view, it cannot provide all the data provided by the current system such as segmentation and shopping behavior.

U.S. Pat. No. 6,922,691 of Flank (hereinafter Flank) disclosed a system for digital media management, retrieval and collaboration. Although the system uses similar technology as that described in the current invention, it does not use sophisticated software modules to analyze the video further, and the primary goal of the system is different. The system uses face recognition technology to identify people in the video and index the video according to this data. It does not use the data to measure the effectiveness of marketing campaigns at reaching the audience.

SUMMARY

The present invention describes system and method for measuring effectiveness of a marketing campaign on digital signage. Typically, in a marketing campaign, advertisers place advertisements on many different signage networks. They do not have effective means to measure the efficiency of the campaign at reaching targeted audience and the effectiveness of conveying the message.

The media content rating system will provide a quantitative measure of how many people did the campaign reach and what effect did it have. The data will be available at the aggregate level, at network level and down to the screen level.

The digital signage marketplace is highly fragmented with a large number of networks operating in different environments. As a result large advertisers have to deal with many networks to execute a campaign. It is nearly impossible for advertisers to measure the effectiveness of the campaigns after they have been executed because each network provides different types of measurements. Many times the networks are not able to provide any measurement to the advertisers at all.

Most commonly used methods of measuring marketing campaigns are interviews, surveys, and manual observations. These methods are very inaccurate because they are very subjective, and work with insufficient sample size.

This invention provides a solution to the challenges created by wide variety of measurements and lack of accuracy. By using automated audience measurement, the current invention is able to collect, large, statistically significant data for analysis. Non-intrusive, computer based measurement also ensure that the data is free from any biases.

DRAWINGS—FIGURES

Figure 4:
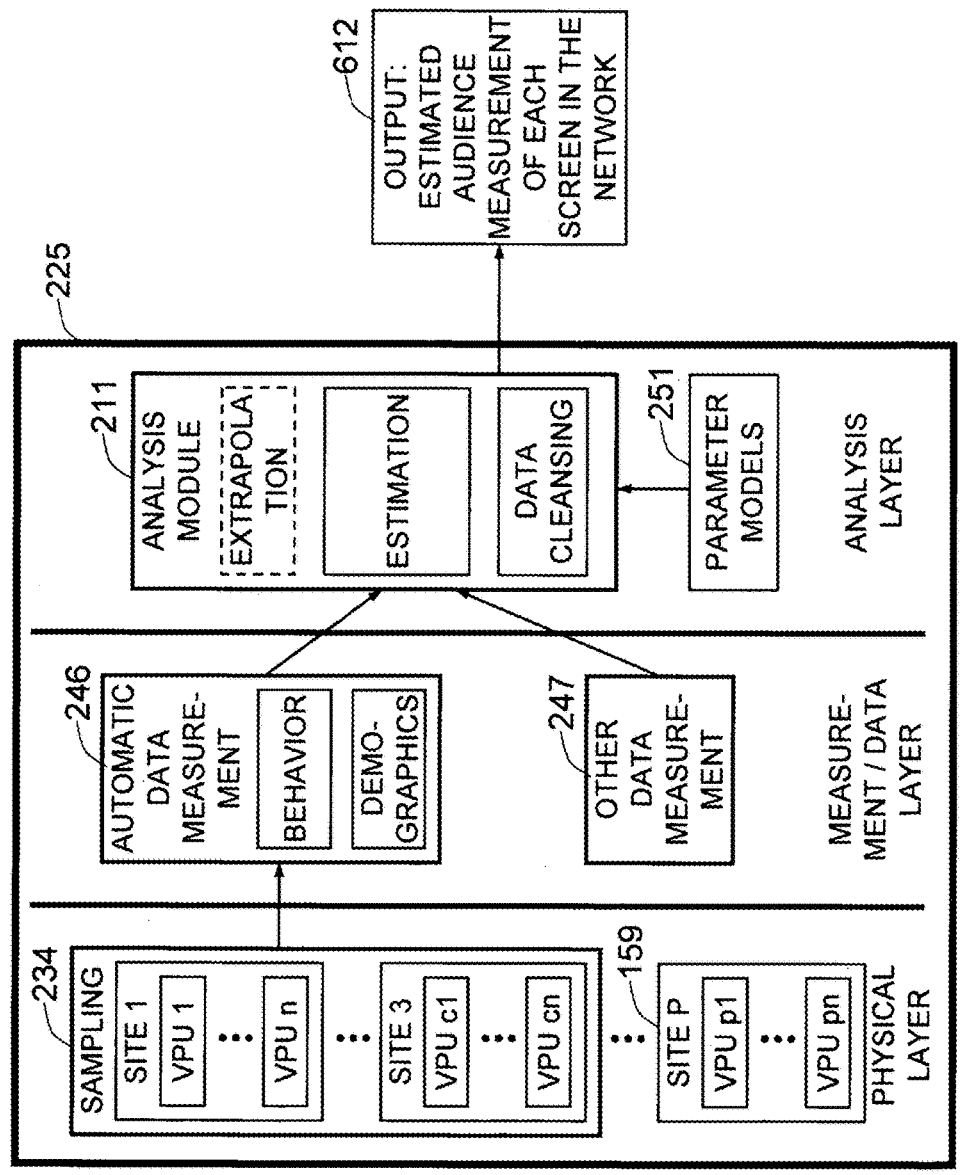

FIG. 4 describes the screen level audience data measurement module.

Figure 5:
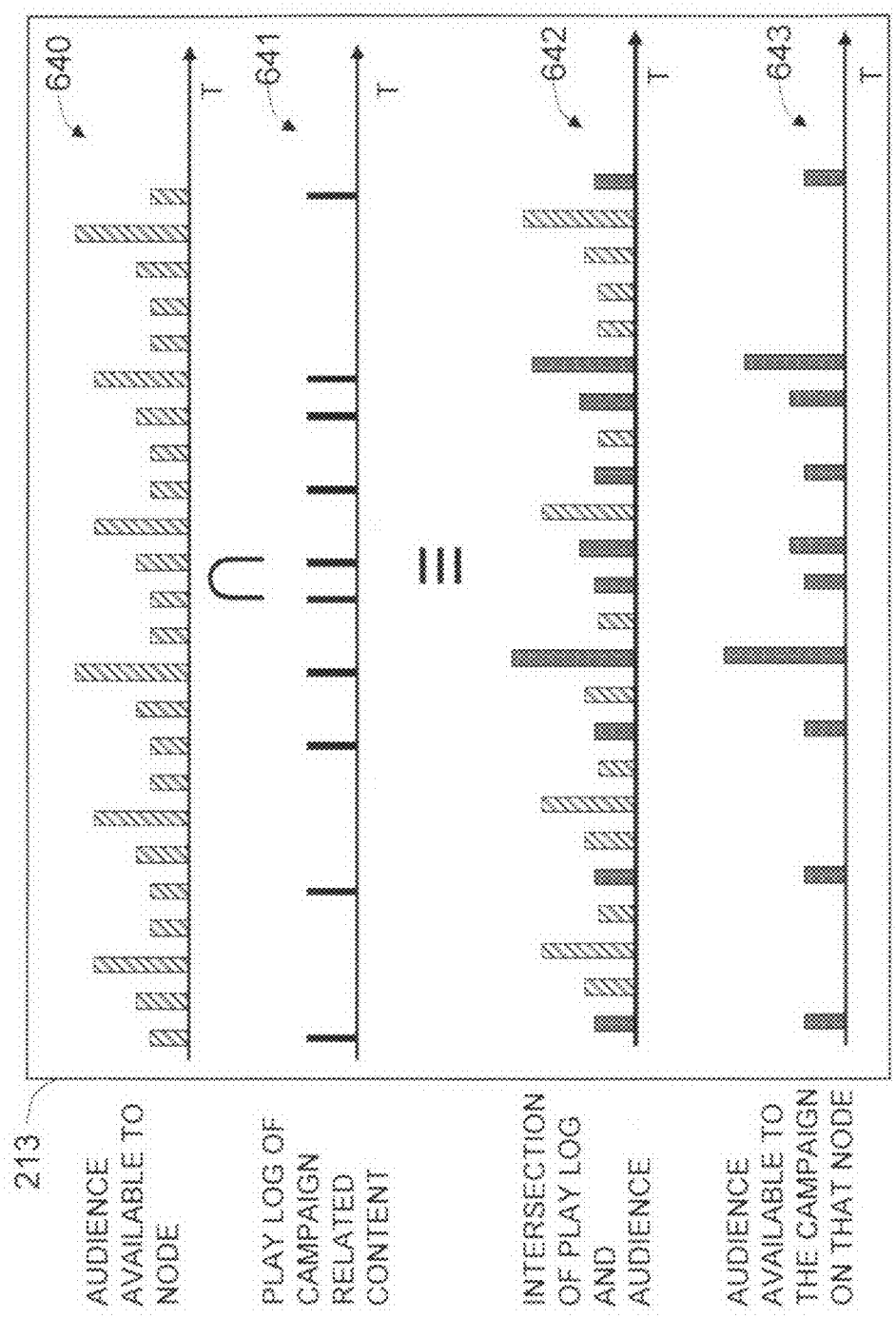

FIG. 5 describes the audience data filtration module.

Figure 6:
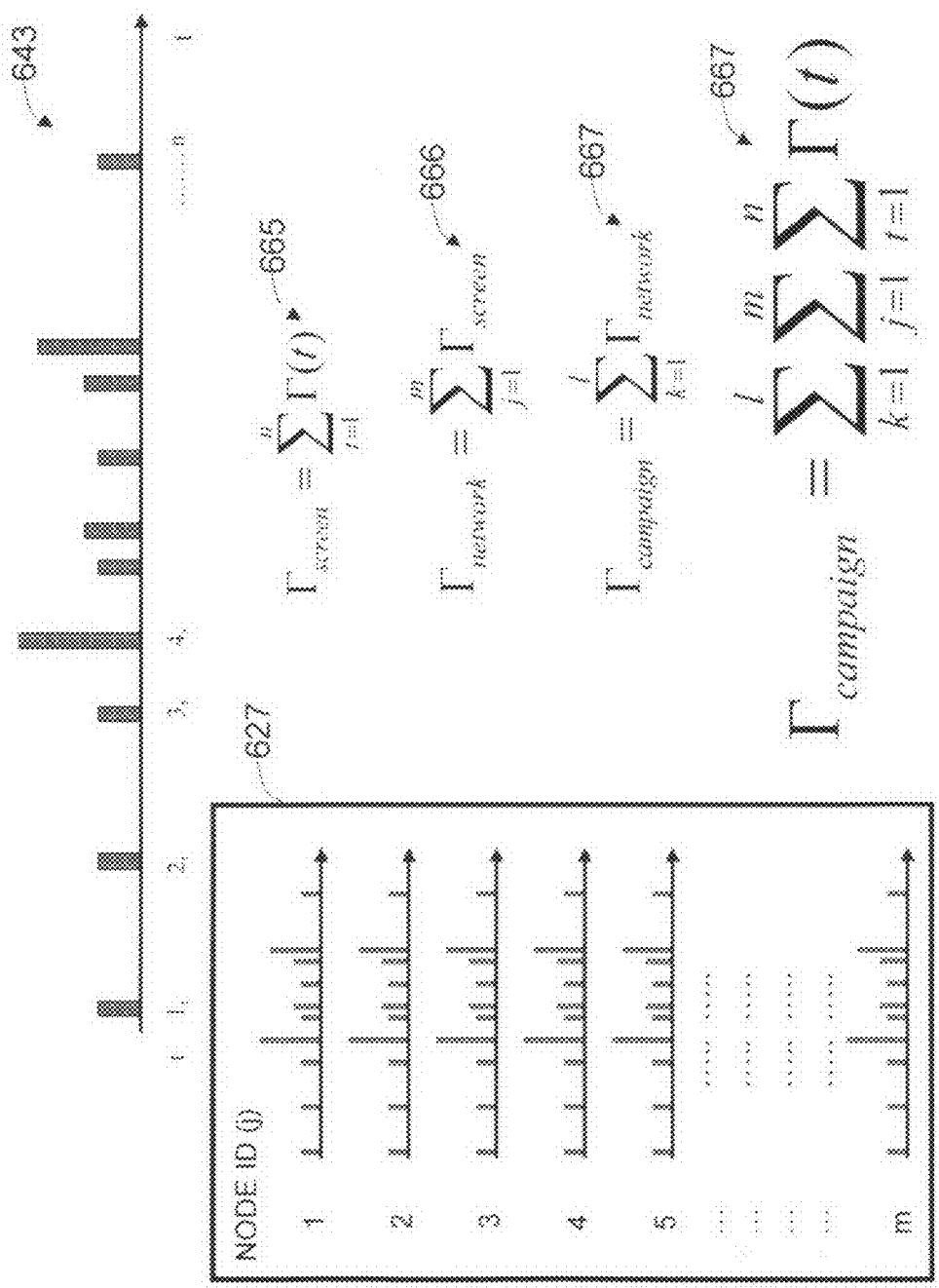

FIG. 6 describes the process of aggregating the audience data from screen level to the campaign level.

Figure 7:
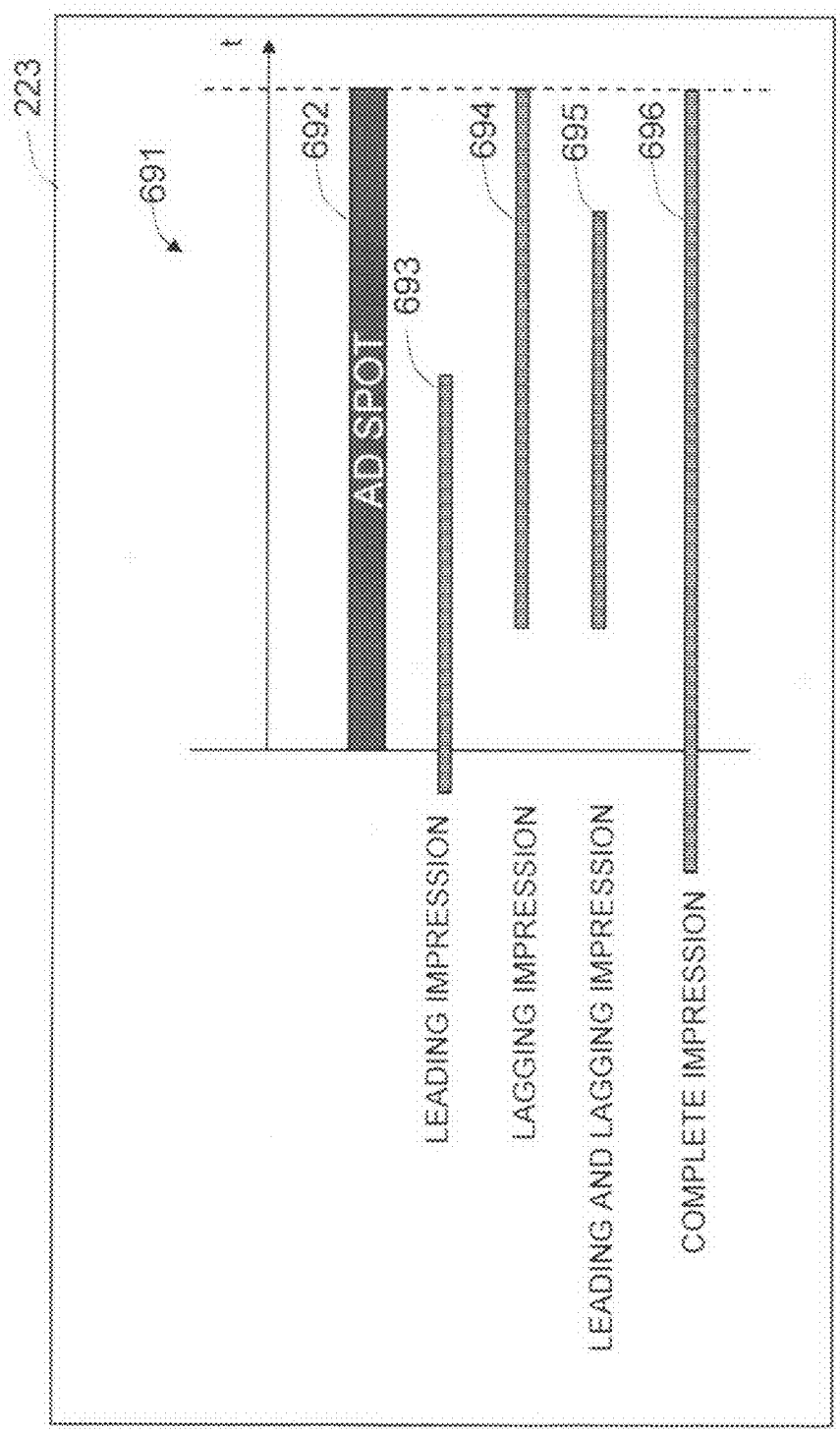

FIG. 7 describes the impression analysis module.

Figure 8:
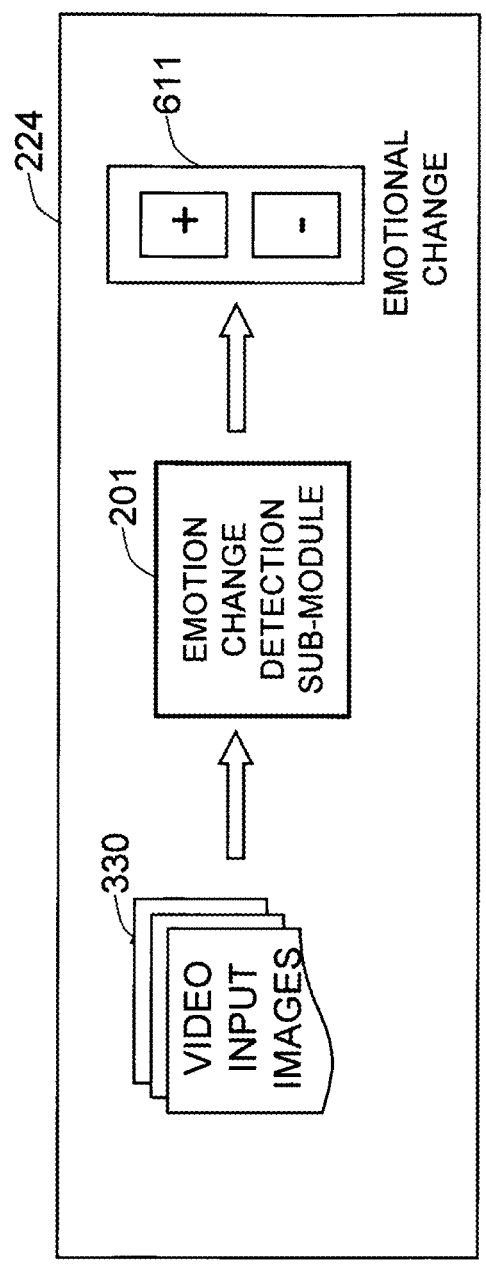

FIG. 8 describes the method and system for measuring the emotional response audience has to a given content, all the responses can be aggregated to get campaign level response measurement.

Figure 9:
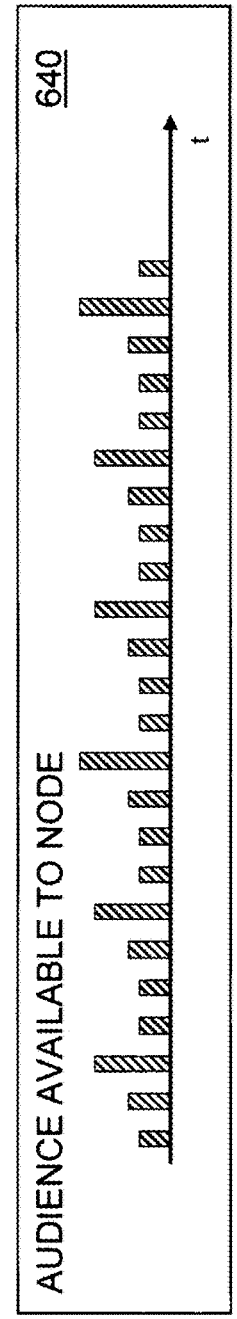

FIG. 9 describes the audience data format. The audience data has two parts—traffic data and impressions data. The data is aggregated into fixed intervals of time, to get counts of audience available to the network.

Figure 10:
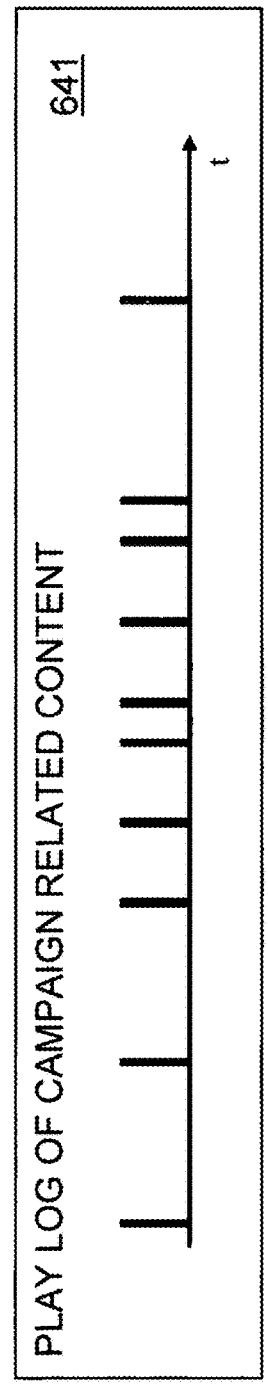

FIG. 10 describes the media play log. Each node will have a media play log, which will have a record of every content played on the node.

Figure 11:
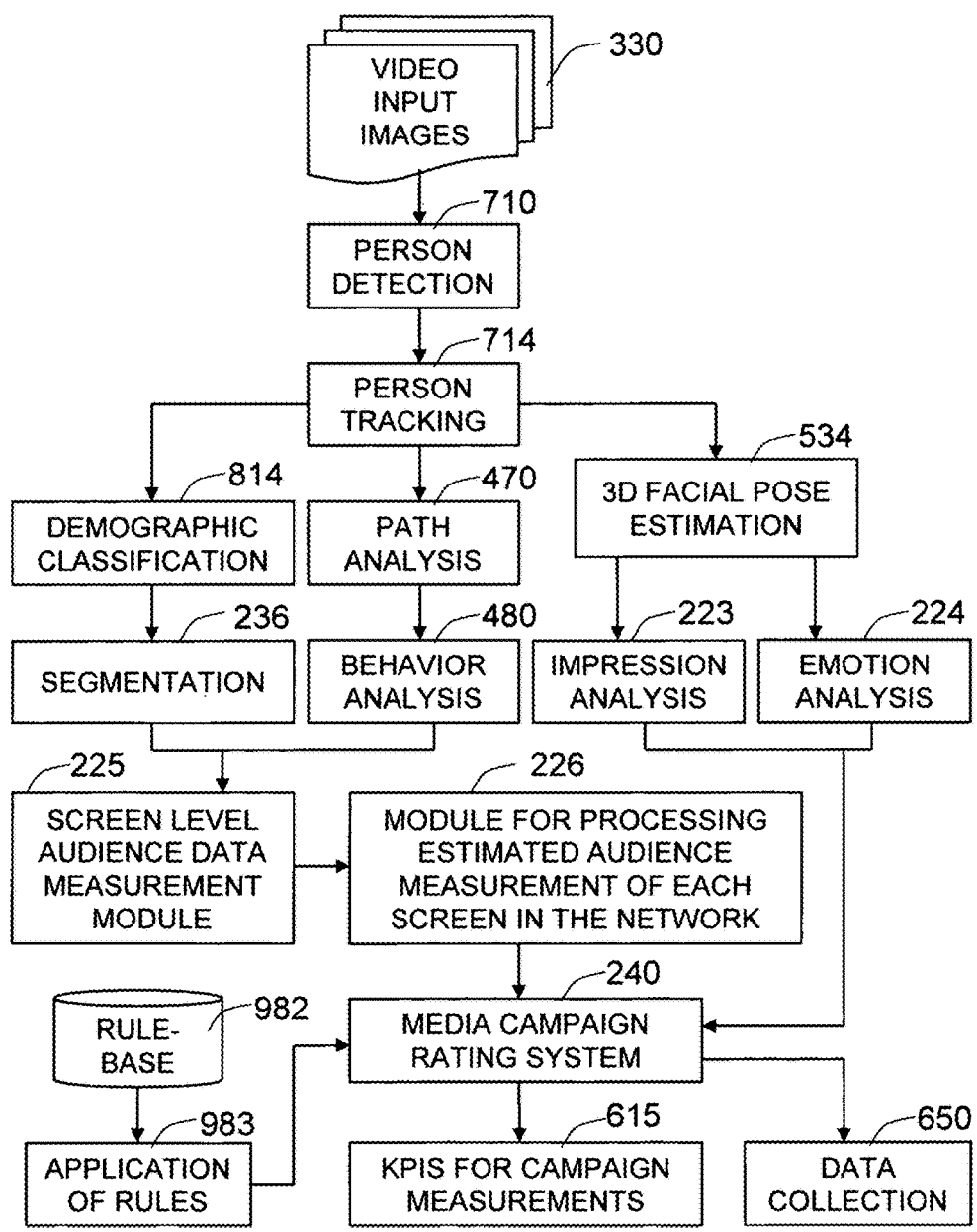

FIG. 11 shows exemplary processes in the measurement and data layer, in which computer vision based behavior analysis and segmentation measurement, i.e., demographics measurement, and impression analysis are combined in an exemplary embodiment of the invention.

Figure 12:
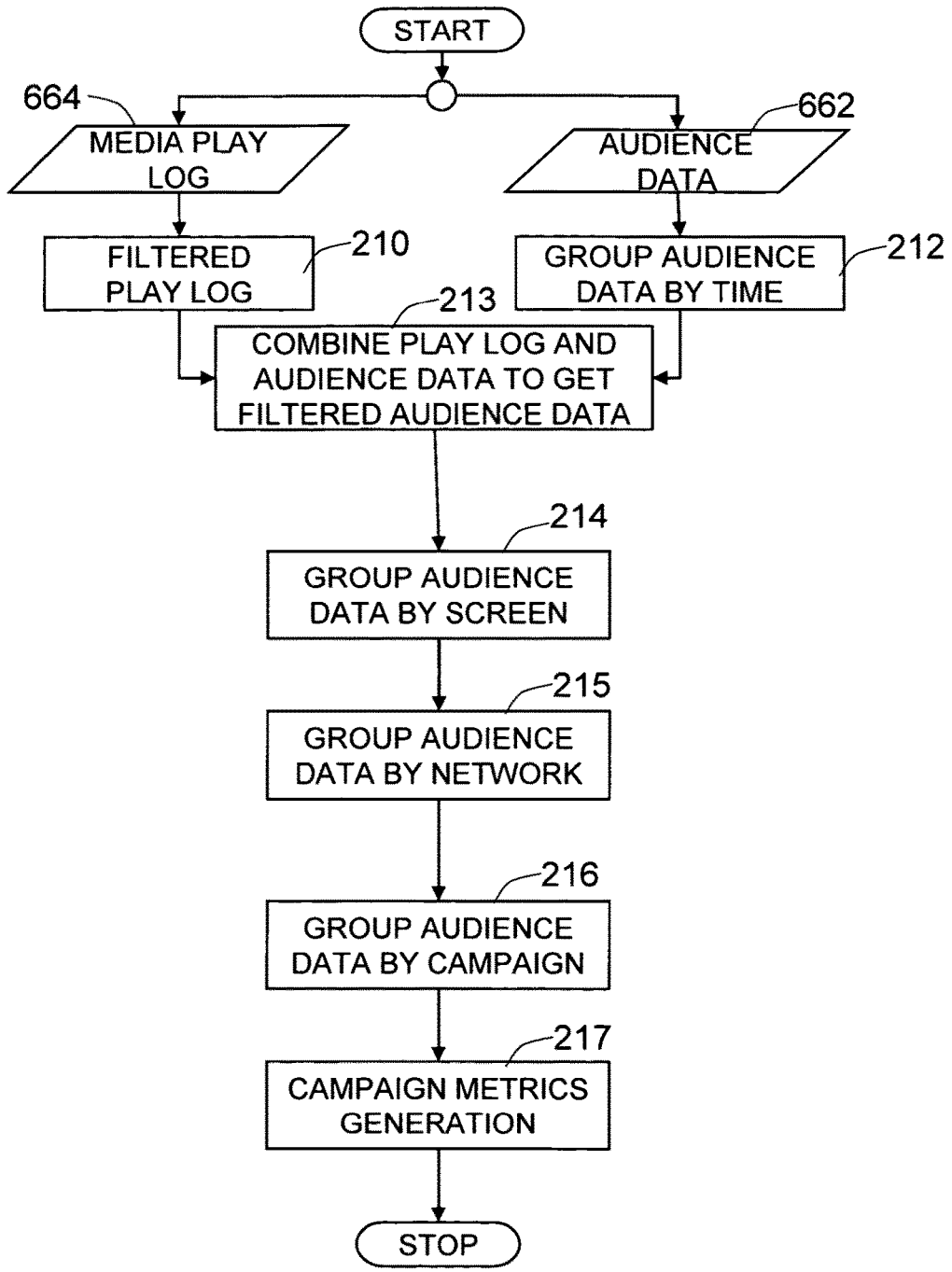

FIG. 12 describes the process of combining audience data and media play log to arrive at exposure measurement for marketing campaign.

DETAILED DESCRIPTION OF THE INVENTION

The present invention is a method and system for measuring the reach and impact of a marketing campaign executed on one or many digital signage networks. Typically when an advertiser plans to run a marketing campaign on digital signage networks, it has to deal with a large number of regional and venue specific networks.

It is very difficult to measure the impact of these campaigns because networks are highly diverse. The type of venue they are in dictates how audience interacts with it. The networks do not have a standard format for reporting audience data, which makes it difficult to compare the reach and impact of individual networks.

The most commonly used forms of impact measurement are attitudinal surveys conducted with a small set of randomly selected audience members and onsite observational research. Although these forms of research give some idea about the impact of the campaign, they are highly inefficient and inaccurate. It is very expensive and time consuming to conduct onsite interviews, so most of the analysis is based on statistically insignificant data. Most of such research does not cover all the types of networks the campaign is running on. The data collected is highly subjective and is skewed by the biases of interviewers.

The disclosed system solves the issues in the above mentioned methodology by providing analysis based on large sample of data objective, quantitative data.

Figure 1:
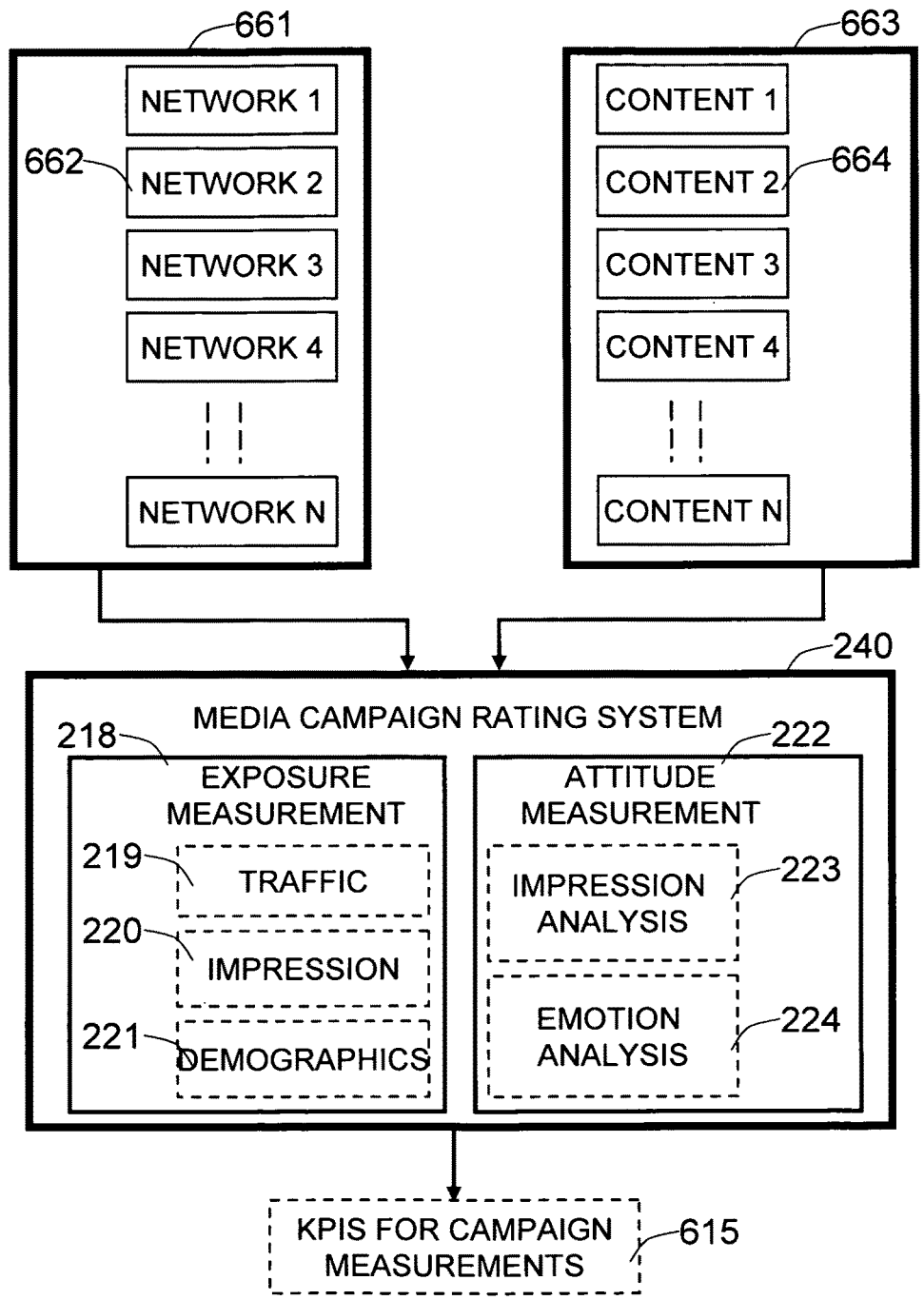
FIG. 1 shows an overview of an exemplary embodiment of the present invention.

As shown in FIG. 1, the system has two main inputs—audience measurement data 661 and media play log 663 for the whole campaign. Audience measurement data consists of characteristics and audience data for individual network 662 collected from a plurality of digital signage networks 161 involved in the campaign. Media play log consists of play log for individual content 664 involved in the campaign. The system uses this data to provide measurement 615 along five distinct dimensions. Each dimension is a measure of effectiveness of the marketing campaign.

1. Exposure Measurement (Done by Exposure Measurement Module 218)

a. Traffic—analysis of the total number of people who were exposed to the media. Traffic data can be analyzed to measure the variations based on time-of-day, day-of-week, seasons etc. The traffic can also be analyzed based on the type of venue the networks are located in, and the state of mind the audience is in when they view the media. Data regarding state of mind of the audience is collected using survey response and expert observation. The traffic data can be analyzed along many different axes also. The measurement is done by traffic measurement module 219.

b. Demographic—most campaigns are targeted on a particular demographic group. The campaign managers are interested in knowing how many people of a given demographic group the campaign reached. The measurement is done by demographic measurement module 221.

c. Impression—impression is defined as the act of viewing a media by the audience. The longer audience looks at the media the more engaged they are with it. Analysis of the total viewing time garnered by the campaign is important for measuring its effectiveness. The measurement is done by impression measurement module 220.

2. Attitude Measurement (the Measurement is Done by Attitude Measurement Module 222.)

a. Impression analysis—detailed analysis of content can uncover the graphics that audience find most engaging and the graphics that they find most disengaging. The content can be considered more effective if it is able to hold the attention of the viewers for the whole duration. (The measurement is done by impression analysis module 223.)

b. Emotional analysis—most contents are designed to emotionally impact the viewers. A measure of the change in emotion of viewers is an important measure of effectiveness of a marketing campaign. (The measurement is done by emotion analysis module 224.)

Based on the dimensions, the present invention can produce the KPIs (key performance indicators) for campaign measurements 615 in an exemplary embodiment. KPIs include exposure metrics and attitudinal metrics. Examples of exposure metrics are total traffic exposed to the campaign, total reach achieved, conversion ratio (total viewers/actual audience), total engagement duration of all the viewers etc. Examples of attitudinal metrics are attraction index for the content, engagement index for the content, emotion change index etc. Other types of metrics that use the underlying data can also be developed.

Figure 2:
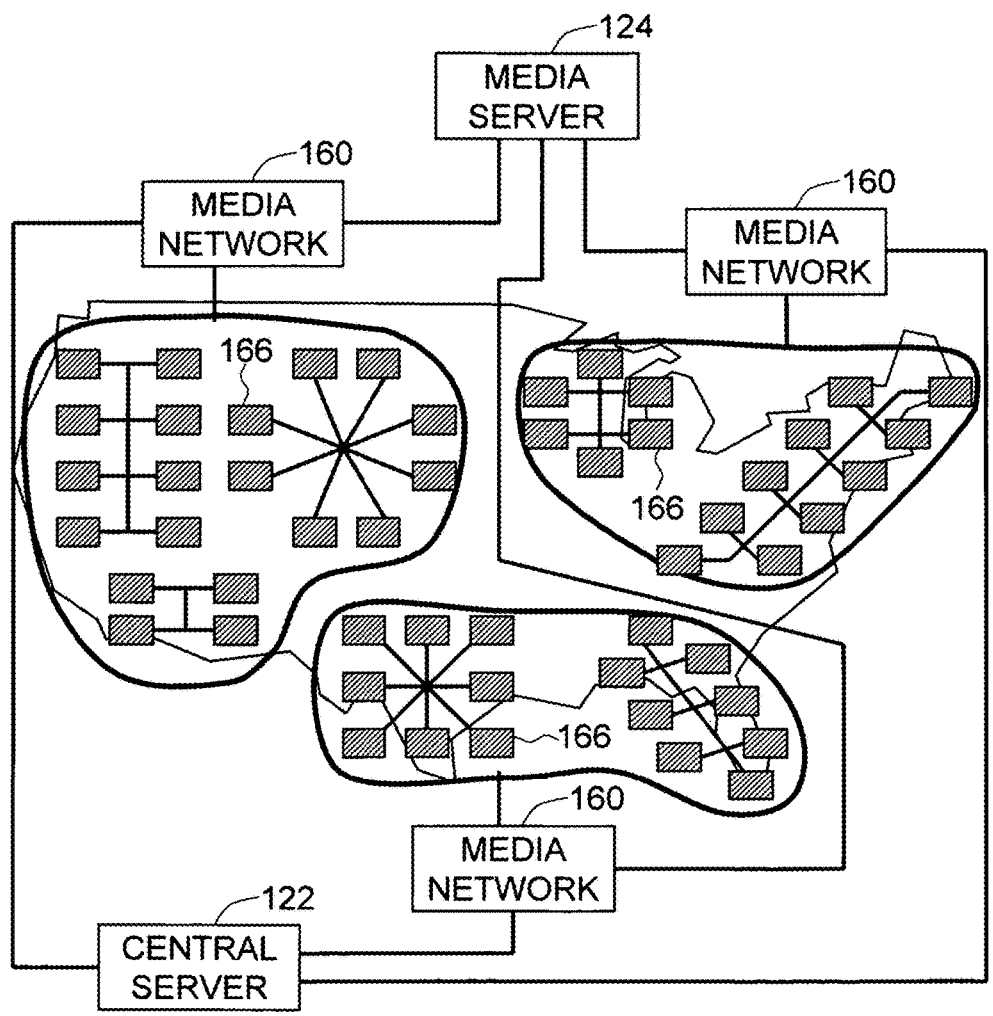
FIG. 2 shows exemplary digital signage networks where an exemplary embodiment of the present invention is deployed.

FIG. 2 shows exemplary digital signage networks where an exemplary embodiment of the present invention is deployed. As shown in FIG. 2, each network in the digital signage networks is connected to a "central server" 122 that controls a plurality of vision processing units (VPUs) for the sampled digital signage. The sampled digital signage 166 is also connected to the media server 124 that provides the media content to the signage.

Figure 3:
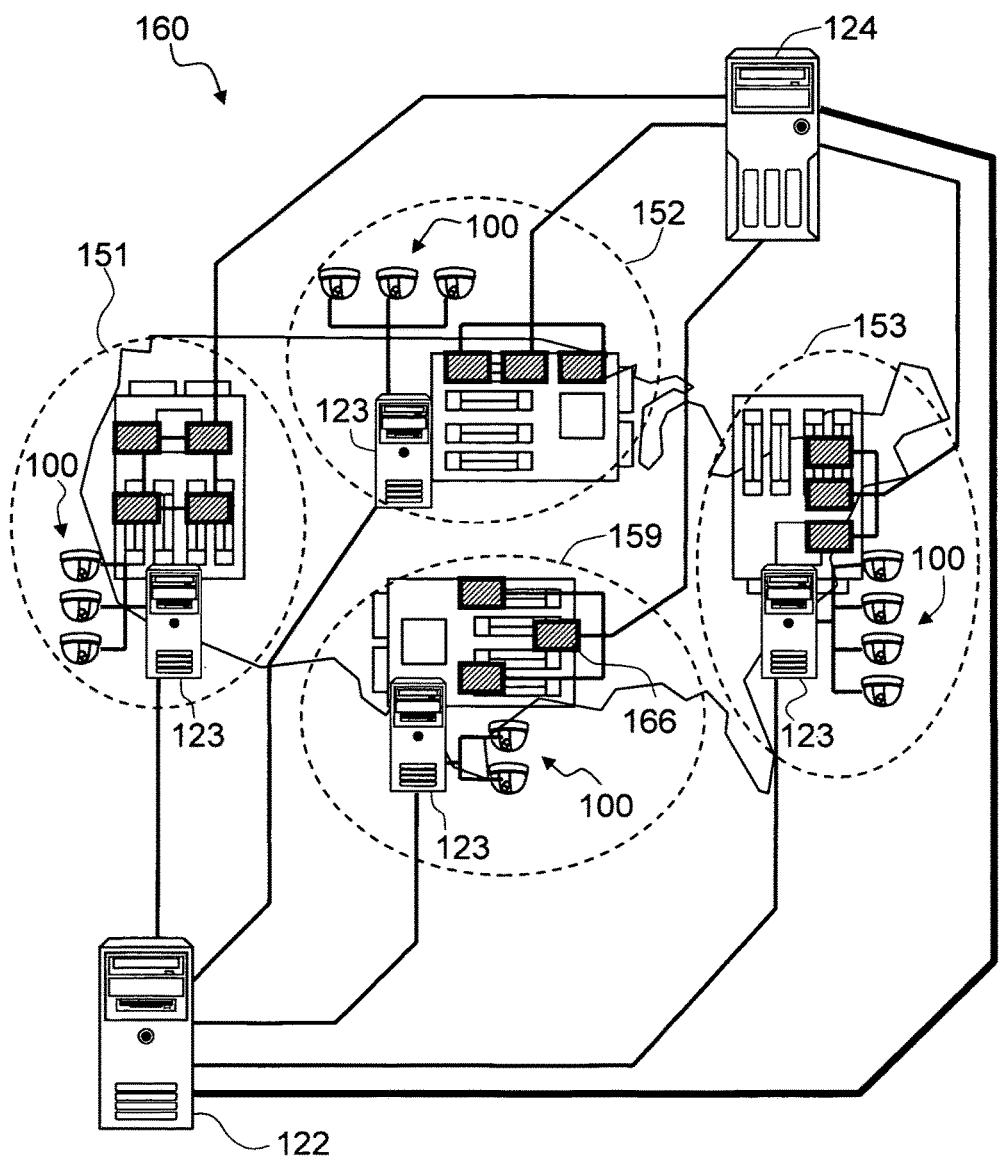
FIG. 3 shows an exemplary system architecture and hardware components of the present invention in a digital signage network among the plurality of the digital signage networks.

FIG. 3 shows an exemplary system architecture and hardware components of the present invention in a digital signage network 160 among the plurality of the digital signage networks.

In the exemplary embodiment shown in FIG. 3, a "central server" 122 controls a plurality of vision processing units (VPUs) in the sites of the digital signage network 160, such as the "site 1" 151, "site 2" 152, "site 3" 153, and "site P" 159. Each site comprises a plurality of digital signage 166 that play a marketing campaign in the signage network. The "vision processing unit" 123 comprises a means for control and processing, means for video interface, and a plurality of means for capturing images 100. The VPU processes the measurement of the behavior patterns and demographics of people in the vicinity for each sampled digital signage in the signage networks, in coordination with the "central server" 122.

Each sampled digital signage is also connected to the media server 124 that provides the media content to the signage. The media server 124 also provides the play log information to the central server 122.

In the exemplary embodiment shown in FIG. 3, a plurality of means for capturing images 100 are connected to the means for video interface. The means for control and processing takes digitized video data from the means for video interface. The means for control and processing can have internal means for storing data or external means for storing data.

The means for capturing images 100 can comprise an analog camera, USB camera, or Firewire camera. The means for video interface, which can comprise a video frame grabber, USB interface, or Firewire interface, are typically included in the same enclosure as the means for control and processing. The means for control and processing can be a general-purpose personal computer, such as a Pentium 4 PC, or a dedicated hardware that can carry out the required computation. The means for control and processing, as well as the means for video interface, can be located locally or remotely, as long as the connection to the means for capturing images 100 can be established. The internal means for storing data, such as internal hard disks, is placed within the same enclosure as the means for control and processing. The external means for storing data, such as a network storage driver or internal hard disks contained in a remote computer, can be located locally or remotely, as long as a means for transferring data is available.

In an exemplary embodiment, a general purpose USB webcam can serve as the means for capturing images 100. A Pentium 4 2.8 GHz PC having 1 GB memory can serve as a means for control and processing, where a generic USB interface included in the PC's motherboard can serve as a means for video interface. A generic IDE hard disk drive can serve as the internal means for storing data or the external means for storing data.

FIGS. 4, 5 and 6 describe the exposure related measurement of the campaign. These measurements tell the advertisers how many people did the campaign reach, what portion of the audience were of targeted demographics, how long did they watch the media for.

FIG. 4 describes the screen level audience data measurement module 225. The methods and systems disclosed in U.S. patent application Ser. No. 11/818,485 filed on Jun. 14, 2007 of Saurabh, et al. (hereinafter Saurabh Ser. No. 11/818,485) provide audience data for individual networks down to screen level. A sample of sites is chosen for actual data collection where the video processing units and cameras are installed. The present invention captures a plurality of input images of the people in the vicinity of the digital signage by a plurality of means for capturing images, and tracks each person. Then, the present invention processes the plurality of input images in order to analyze the behavior and demographics of the people. The data collected at these sites are combined with other forms of data such as door traffic, geo-demographics etc. for other locations to extrapolate the data regarding audience available to a given network.

The audience data from one or many networks are combined to produce campaign ratings. Analyses can be conducted by using a sample or all of the data.

Output of the screen level audience data measurement module is traffic data 624 and impression data 625 as shown in FIG. 9. The raw data can be combined to arrive at aggregate parameters (traffic, impressions etc) over time 640.

The output is different from that of the methods and systems disclosed in Saurabh Ser. No. 11/818,485 because here we are extracting the audience measurement such as traffic, impression count, impression lengths etc for each screen in the network. In Saurabh Ser. No. 11/818,485, we were extracting media metrics such as gross rating points, targeted rating points etc.

Each screen in a given digital signage network 160 has a media play log associated with it 626. The play log contains information about what was played on the screen and a timestamp showing when it was played. A subset of the play log belongs to the content specific to the campaign being measured. Only the relevant portion of the play log is taken and its distribution over time is measured to get play log of all content relevant to the campaign played on the screen 641. FIG. 10 shows the play log for 1 screen in 1 network. The present invention accumulates the play log (or its equivalent) for all the screens from all the networks selected for the purpose of campaign rating.

FIG. 5 describes the audience data filtration module. We start with the screen level audience data 640 and screen level content data 641. By intersecting the audience data with play log we get 642. The audience data not specific to the given campaign is removed to get filtered audience data 643. The distribution of filtered audience data can be used to describe any audience related measurement, e.g. traffic, impression count, impression length, emotions, and etc. This data forms the basis of different analyses.

FIG. 6 describes the process of aggregating the audience data from screen level to the campaign level. We take a given measurement we want to aggregate ⌈ 643. the data is stored in the filtered audience data table 627. By aggregating ⌈ over time we get the screen level aggregated measurement 665. The screen level measurement is aggregated to get network level aggregated measurement 666, which is aggregated to get campaign level aggregated measurement 667. The measurement (⌈) can be traffic counts, impression lengths, demographics or any other form of data generated using vision based technologies. The outputs of the process are exposure metrics such as total traffic exposed to the campaign, total reach achieved, conversion ratio (total viewers/actual audience), and total engagement duration of all the viewers. Other types of metrics that use the underlying data can also be developed.

In order to measure the attitudinal impact of the campaign the analysis is done at a more detailed level. The process involves selecting a random sample times when a given content was played on the screen, called a spot. Each spot has content that is a combination of a series of graphics (images, animation and video, audio etc). Sampling is done across multiple dimensions—time, geography, network, etc—to collect a representative sample of spots. The media player and the audience measurement system may be synchronized at the millisecond level to collect this data. The video from the cameras in these locations specific to the play log is selected. The actual impression of each audience member viewing the spot is processed using vision technologies to get the exact beginning and end time for the impression, and how the facial expression of the viewers change over time.

FIGS. 7 and 8 describe the attitude related measurement of the campaign. These measurements are very important for the advertiser to understand what impact the campaign had on the people who were exposed to it. The measurements help advertisers understand whether the content was engaging enough to hold the attention of the viewers, and whether the content produced the desired emotional change in the viewers.

FIG. 7 describes the impression analysis module 223. Based on when the impression started with respect to the ad spot 692 there are four types of impression.

i. Leading impression 693: Impressions that started before the spot started and ended before the spot ended. More than average number of leading impressions is negative for the content because it shows that people were engaged with the signage but the content was not good enough to keep them engaged.

ii. Lagging Impression 694: Impressions that started after the spot started and ended after the spot ended. More than average number of lagging impressions is a good sign because it shows that the content was able to attract and engage the audience.

iii. Leading and Lagging impression 695: Impressions that started after the spot started but ended before the spot ended. More than average number of such impressions shows that the content was able to attract the audience but was not good or relevant enough to keep them engaged.

iv. Complete impression 696: Impression that started before the spot started and ended with or after the spot ended. More than average number of such impressions shows that the content was able to keep the audience engaged and does not tell much about its ability to attract.

The data can be analyzed to measure the impact each graphic in the spot on the audience. Each metric gives a measure of effectiveness of the spot as a whole and individual graphics. A spot that can attract more people and engage them longer can be considered better than the spot that does not. Some exemplary metrics based on this data are as follows.

i. Engagement index for the signage—avg. impression length of the campaign/spot lengths ii. Engagement index for the content—complete impression/total impression iii. Engagement index for the content—1—lagging impression/total impression, iv. Attraction index for the content—leading impression/total impression v. Point of engagement or lag in point—point in the time axis with most impressions start vi. Point of disengagement or lead off point—point in the time axis with most impressions ended FIG. 8 describes the emotion analysis module 224. It measures the emotional response audience has to a given content. Whenever a person engages with a media, his or her facial expression changes in reaction to the content.

Usually the goal of the advertising content is to entice a positive and happy response. The degree (valance) by which a person reacts to a content will be measured using vision based technologies. As the media player and the audience measurement system are synchronized at the millisecond level we can measure exactly what graphic was playing on the screen when the change in facial expression occurred. A set of video input images 330 is provided to the emotional change detection sub-module which measures the magnitude of the emotional change 611.

This reaction is defined as the persuasiveness of the content. The average of all emotional reactions to contents that form a campaign can be considered the unified emotional response to the campaign. The following equation gives and exemplary way to calculate persuasiveness.

$$\text{persuasiveness} = \frac{k}{\text{Total\_impressions}} \sum_{n=1}^{k} \partial \text{emotion}_n$$

Where k is the total number of impression that had an emotional response to the content $\partial \text{emotion}_n$ is the change in response associated with the nth impression.

Several approaches exist for analyzing static images of faces to track the expressions and estimate the emotional state of a person. For example, J. Cohn, A. J. Zlochower, J. Lien, and T. Kanade, "Automated face analysis by feature point tracking has high concurrent validity with manual FACS coding," Psychophysiology, pp. 35-43 1999 (hereinafter Cohn), focus on classification of static images of the face, which are associated with expression of particular emotions. Several approaches have also been reported for analyzing a sequence of images for facial expression analysis and estimating the emotional state of a person. For example, I. Essa and A. Pentland, "Facial expression recognition using a dynamic model and motion energy," presented at International Conference on Computer Vision, June 1995 (hereinafter Essa) disclosed an automated system for facial expression detection using optical flow coupled with a physical model of face muscles to describe the facial motions and Y. Yacoob and L. Davis, "Recognizing Human Facial Expression," University of Maryland, Technical Report CS-TR-3265, May 1994, (hereinafter Yacoob) followed a three-level recognition approach based on the optical flow of points with high gradient values. The above methods aim at classifying low-level facial expressions into FACS type Action Units (AU's).

The present invention can utilize an approach for measuring the change in emotion in response to visual stimulus (from the digital media network) from an analysis of the change of the facial expression, as suggested in Cohn and Essa. Specifically, the present invention can detect a positive or negative change in the "valence" of the emotion so that it can be used as a measure of persuasiveness of the visual stimulus as shown in FIG. 8.

FIG. 9 describes the audience data format. The audience data has two parts—traffic data and impressions data. Traffic data has a record for every person that comes in front of a node in a digital signage network 160. It has rows for unique id, start time (time when the audience person comes in the vicinity of the node), end time (time when they left the vicinity of the node), dwell time (difference between start and end time), and impression (whether they saw the node or not). There can be other columns if necessary. For every person who saw the node, there will be a record in the impressions data. The impressions data will have columns for unique id, start time of the impression, end time of the impression, impression length (difference between start and end time), gender of the viewer, age of the viewer, and ethnicity of the viewer. There can be other columns if necessary. The data is aggregated into fixed intervals of time, to get counts of audience available to the network.

FIG. 10 describes the media play log. A marketing campaign consists of a set of creative materials such as advertisements, infomercials, etc. These are individually referred to as content. These contents are played repeatedly on a set of networks for a given period of time. The screens in the network can play many different contents that are a part of the same campaign. The time slots in which a content is played on a screen are called an ad spots. Each ad spot has a start time, end time and name of the content associated with it.

A record of all the ad spots is called media play log for that screen 626. It will have columns for start time, end time and content description. Media play log is filtered to remove all the content that is not a part of the campaign being measured. The filtered play log can be described a Boolean graph which is on every time a campaign related content is played. This gives us the play log of the campaign related content 641. A collection of media play logs for all the screens in the network is the media play log for the network, and a collection of all the play logs for networks involved in a campaign is the media play log for the campaign.

FIG. 11 shows an exemplary processes in the measurement and data layer, in which computer vision based behavior analysis 480 and segmentation 236 measurement, i.e., demographics classification 814, impression analysis 223, and emotion analysis 224 are combined in an exemplary embodiment of the invention.

In the exemplary embodiment shown in FIG. 11, the present invention detects 710 and tracks 714 a person, such as a customer, in the video input images 330, from a plurality of means for capturing images 100. The present invention can join the trajectories of the person tracks from a video of a means for capturing images 100 to another video of a means for capturing images 100 while the person appears and disappears between the fields of view among a plurality of means for capturing images 100. Based on the tracking information, the present invention performs the path analysis 470 of the particular person. The path analysis 470 can be used as one of the ways to process the behavior analysis 480 of a person and obtain useful information about the person's behavior, such as engagement behavior with the digital campaign.

The present invention can utilize any reliable video-based tracking method for a single customer and a group of customers in the prior art, in regards to the behavior analysis. For example, U.S. patent application Ser. No. 11/880,421 filed on Jul. 20, 2007 of Sharma, et al. (hereinafter Sharma Ser. No. 11/880,421) disclosed an exemplary process of video-based tracking and behavior analysis for a single customer or a group of customers, using multiple means for capturing images in a preferred embodiment of the invention.

The present invention can also process segmentation 236 of the audience, based on the images of the audience in the video. Demographic classification 814 is an exemplary segmentation 236 of the audience.

The present invention can utilize any reliable demographic composition measurement method in the prior art as an exemplary video-based segmentation of the audience. For example, U.S. patent application Ser. No. 11/805,321 filed on May 23, 2007 of Sharma, et al. (hereinafter Sharma Ser. No. 11/805,321) disclosed an exemplary demographic composition measurement based on gender and ethnicity.

The segmentation 236 and behavior analysis 480 data are collected at a sample of screens in the network. The data is sent to the screen level audience data measurement module 225 where the data is extrapolated to produce estimated audience measurement of each screen in the network. Module for processing estimated audience measurement of each screen 226 reformats and transfers the data to media campaign rating system 240, where the data is combined with media play log to generate exposure related measurements for the media campaign.

Impression analysis 223 and emotion analysis 224 are carried on images of the audience for an ad spot to measure attitudinal impact the content has on the audience. A sample of ad spots is selected from the campaign for impression and emotion analysis to generate attitude related measurements for the media campaign.

There are two types of impression measurement in an exemplary embodiment of the present invention. First level of the impression measurement is to count and measure the impression length, and the second level of the impression measurement is deeper impression analysis as discussed in FIG. 7. With regard to the first level of impression count and measurement, the present invention can utilize any well-known impression measurement method. U.S. patent application Ser. No. 11/818,554 filed on Jun. 14, 2007 of Sharma, et al. (hereinafter Sharma Ser. No. 11/818,554) disclosed details of a system for measuring the impression level through the viewership of audience. An exemplary embodiment of the present invention shown in FIG. 11 can utilize Sharma Ser. No. 11/818,554 for the first level of impression measurement in the impression analysis 223, especially utilizing the 3D facial pose estimation 534.

Exposure related measurements and attitude related measurements together are used to produce the KPIs for campaign measurement 615.

It is important to note that exposure related measurements are computed for all the screens in the network using the extrapolated audience data produced by screen level audience data measurement module 225. But the attitude related measurements are done only for a small sample of ad spots and do not use the data computed in screen level audience data measurement module.

The measured data can be stored in a database at the data collection process 650. The analysis of the measured data can be further facilitated by applying 983 a set of predefined rules in a rule-base 982.

FIG. 12 describes the process of combining audience measurement data 661 and media play log 663 to arrive at exposure measurement for the marketing campaign. We take audience data as described in FIG. 9. The data is aggregated using audience data grouping module 212 to get counts of audience available to the screen by a given unit of time—hour or day or any other unit of time. Dwell time and impression length can also be summed up to get total time audience was exposed to the media. Media play log described in FIG. 10 is filtered and aggregated using play log filtration module 210 to get Boolean graph of when the campaign related content was playing on the screen. Aggregation of media play log is done along the same unit of time as audience data.

These two data sets are then synchronized in the audience data filtration module 213 so that they can be compared over time. An intersection of the audience available to the node and the media play log of campaign related content is done to get audience available to the campaign on that node.

The data is aggregated over the entire duration of the campaign to get the total audience available to the campaign on that screen, using the screen level audience data aggregation module 214.

The audience available to the campaign on that note data is aggregated over the whole network to get the total audience available to the campaign on that network using the network level audience data aggregation module 215.

The total audience available to the campaign on that network data is aggregated over all the networks the campaign was ran on to get total audience reached by the campaign using the campaign level audience data aggregation module 216.

The total audience reached by the campaign is an exemplary metric. Metric generation module 217 applies the same process to calculate other metrics such as total viewing time achieved by the campaign, or standard media metrics such as Gross Rating Points, Targeted Rating Points, etc.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A computer-implemented method for measuring an effectiveness of a marketing campaign on digital signage on signage networks using a set of video processing units, comprising the following steps of:
   a) building a vision processing unit by capturing a plurality of input images of a plurality of people by a plurality of cameras in a vicinity of a sampled digital signage in the signage networks, wherein the plurality of cameras are connected to at least a video interface, which transfers the plurality of input images to at least a computer,
   b) processing by means of a segmentation analysis and a path analysis the plurality of input images in order to measure a set of behavior patterns and a set of demographics of each person in the plurality of people,
   c) gathering a set of audience measurement data by aggregating measurements for the set of behavior patterns and the set of demographics of each person in the plurality of people, wherein the set of behavior patterns are determined from the path analysis, and wherein the set of demographics are determined from the segmentation analysis,
   d) getting a media play log for individual networks from a media server that provides content to the sampled digital signage,
   e) analyzing and extracting a set of characteristic information from the segmentation analysis and the path analysis based on a set of estimated parameters from the set of audience measurement data, wherein the segmentation analysis uses a demographic composition measurement method, wherein the path analysis analyzes a set of trajectories of the plurality of people, and wherein the set of trajectories are joined from multiple images,
   f) processing the set of characteristic information by reformatting and transferring the set of characteristic information to a media campaign rating system and combining the set of characteristic information with the media play log to generate exposure related measurements,
   g) measuring an efficiency of the marketing campaign at reaching a targeted audience and the effectiveness of the marketing campaign at conveying a message based on the set of characteristic information, wherein a demographics measurement is used to target a particular demographic group for the marketing campaign, and
   h) producing metrics comprising a first engagement index for the sampled digital signage, including impression lengths and a plurality of spot lengths; a second engagement index for the content, calculated as a complete impression divided by a total impression; a third engagement index for the content, calculated as a lagging impression divided by the total impression; an attraction index for the content, calculated as a leading impression divided by the total impression; a point of engagement or a lag in point, which is a point in a time axis when most impressions started, and a point of disengagement or a lead off point, which is a second point in the time axis when most impressions ended.

2. The method according to claim 1, wherein the method further comprises measuring traffic of the plurality of people by using a second path analysis to calculate a total number of people who were exposed to the content, wherein traffic data is analyzed to measure variations during a predefined window of time, comprising time-of-day, day-of-week, and seasons.

3. The method according to claim 1, wherein the method further comprises measuring impression levels by detecting an act of viewing the content by an audience, and by collecting a total viewing time garnered by the marketing campaign, whereby an analysis of the total viewing time garnered by the marketing campaign is used for measuring the effectiveness of the marketing campaign.

4. The method according to claim 1, wherein the method further comprises measuring impression levels and analyzing a measured impression in detail, wherein a detailed analysis of the measured impression identifies points that an audience finds most engaging and second points that the audience finds most disengaging, and wherein the detailed analysis of the measured impression indicates a start time and an end time of impression, an impression length, a gender of a viewer, an age of the viewer, and an ethnicity of the viewer.

5. The method according to claim 4, further comprising combining the start time and the end time of the measured impression through computer vision algorithms resulting in a plurality of impression types, comprising leading impression, lagging impression, leading and lagging impression, and complete impression.

6. The method according to claim 1, wherein the method further comprises measuring the effectiveness of the marketing campaign by detecting a set of emotional changes in an audience in response to a stimulus, wherein the set of emotional changes is determined from a facial expression analysis.

7. The method according to claim 1, wherein the method further comprises filtering a set of audience data to get data specific to the marketing campaign, comprising the following steps of:
   a) getting a set of screen level audience data by time,
   b) gathering a play log of times when contents belonging to the marketing campaign are played, and
   c) intersecting the set of audience data with the play log.

8. The method according to claim 1, wherein the method further comprises aggregating the set of audience measurement data from a screen level to a campaign level, comprising the following steps of:
   a) aggregating a set of measurements over time for a screen,
   b) aggregating a screen level measurement for a network measurement, and
   c) aggregating the network measurement for a campaign measurement, whereby the campaign measurement comprises traffic counts, impression lengths, and demographics generated using vision based technologies.

9. The method according to claim 1, wherein the method further comprises utilizing a rule application logic module for analyzing and extracting the set of characteristic information based on the set of estimated parameters from the set of audience measurement data and applying the set of characteristic information for measuring the efficiency of the marketing campaign, whereby the rule application logic module enables an adjustment in the analysis and extraction of the set of characteristic information to be done in a structured and dynamic way.

10. An apparatus for measuring an effectiveness of a marketing campaign on digital signage on signage networks, comprising:
   a) at least a camera that captures a plurality of input images of a plurality of people in the vicinity of a sampled digital signage in said signage networks, and
   b) at least a computer configured to:
   process said plurality of input images by means of a segmentation analysis and a path analysis in order to measure a set of behavior patterns and a set of demographics of each person in the plurality of people,
   gather a set of audience measurement data by aggregating measurements for the set of behavior patterns and the set of demographics of each person in the plurality of people, wherein the set of behavior patterns are determined from the path analysis, and wherein the set of demographics are determined from the segmentation analysis,
   get a media play log for individual networks from a media server that provides content to the sampled digital signage,
   analyze and extract a set of characteristic information from the segmentation analysis and the path analysis based on a set of estimated parameters from the set of audience measurement data, wherein the segmentation analysis uses a demographic composition measurement method, wherein the path analysis analyzes a set of trajectories of the plurality of people, and wherein the set of trajectories are joined from multiple images,
   process the set of characteristic information by reformatting and transferring the set of characteristic information to a media campaign rating system and combining the set of characteristic information with the media play log to generate exposure related measurements, and
   measure an efficiency of the marketing campaign at reaching a targeted audience and the effectiveness of the marketing campaign at conveying a message based on the set of characteristic information, wherein a demographics measurement is used to target a particular demographic group for the marketing campaign, and
   produce metrics comprising a first engagement index for the sampled digital signage, including impression lengths and a plurality of spot lengths; a second engagement index for the content, calculated as a complete impression divided by a total impression; a third engagement index for the content, calculated as a lagging impression divided by the total impression; an attraction index for the content, calculated as a leading impression divided by the total impression; a point of engagement or a lag in point, which is a point in a time axis when most impressions started, and a point of disengagement or a lead off point, which is a second point in the time axis when most impressions ended.

11. The apparatus according to claim 10, wherein the apparatus further comprises the computer configured to measure traffic of the plurality of people by using a second path analysis to calculate a total number of people who were exposed to the content, wherein traffic data is analyzed to measure variations during a predefined window of time, comprising time-of-day, day-of-week, and seasons.

12. The apparatus according to claim 10, wherein the apparatus further comprises the computer configured to measure impression levels by detecting an act of viewing the content by an audience and by collecting a total viewing time garnered by the marketing campaign, whereby an analysis of the total viewing time garnered by the marketing campaign is used for measuring the effectiveness of the marketing campaign.

13. The apparatus according to claim 10, wherein the apparatus further comprises the computer configured to measure impression levels and analyze a measured impression in detail, wherein a detailed analysis of the measured impression identifies points that an audience finds most engaging and second points that the audience finds most disengaging, and wherein the detailed analysis of the measured impression indicates start time and end time of impression, an impression length, a gender of a viewer, an age of the viewer, and an ethnicity of the viewer.

14. The apparatus according to claim 13, wherein the apparatus further comprises the computer configured to combine the start time and the end time of the measured impression through computer vision algorithms resulting in a plurality of impression types, comprising leading impression, lagging impression, leading and lagging impression, and complete impression.

15. The apparatus according to claim 10, wherein the apparatus further comprises the computer configured to measure the effectiveness of the marketing campaign by detecting a set of emotional changes in an audience in response to a stimulus, wherein the set of emotional changes is determined from a facial expression analysis.

16. The apparatus according to claim 10, wherein the apparatus further comprises the computer configured to filter a set of audience data to get data specific to the marketing campaign by:
   a) getting a set of screen level audience data by time,
   b) gathering a play log of times when contents belonging to the marketing campaign are played, and
   c) intersecting the set of audience data with the play log.

17. The apparatus according to claim 10, wherein the apparatus further comprises the computer configured to aggregate the set of audience measurement data from a screen level to a campaign level by:

a) aggregating a set of measurements over time for a screen,
b) aggregating a screen level measurement for a network measurement, and
c) aggregating the network measurement for a campaign measurement, whereby the campaign measurement comprises traffic counts, impression lengths, and demographics generated using vision based technologies.

18. The apparatus according to claim 10, wherein the apparatus further comprises the computer configured to utilize a rule application logic module to analyze and extract the set of characteristic information based on the set of estimated parameters from the set of audience measurement data and apply the set of characteristic information to measure the efficiency of the marketing campaign, whereby the rule application logic module enables an adjustment in the analysis and extraction of the set of characteristic information to be done in a structured and dynamic way.

* * * * *